United States Patent [19]

Itagaki et al.

[11] Patent Number: 4,696,745

[45] Date of Patent: Sep. 29, 1987

[54] SEPARATING AGENT WITH FLUOROALKYL GROUP

[75] Inventors: Takaharu Itagaki; Hiroshi Kusano, both of Yokohama; Eiji Miyata, Tokyo; Hirohisa Kubota, Kawasaki, all of Japan

[73] Assignee: Mitsubishi Chemical Industries Ltd., Tokyo, Japan

[21] Appl. No.: 849,764

[22] Filed: Apr. 9, 1986

[30] Foreign Application Priority Data

Apr. 9, 1985 [JP] Japan .................................. 60-74705
Jun. 10, 1985 [JP] Japan ................................. 60-125642

[51] Int. Cl.$^4$ .......................... B01D 15/08; C08J 9/36
[52] U.S. Cl. .......................... 210/502.1; 210/635; 210/198.2; 502/402; 521/53; 521/140; 521/149; 525/329.5; 525/359.3; 525/359.4
[58] Field of Search ............... 502/402; 525/329.5, 525/359.3, 359.4; 210/635, 656, 198.2, 198.3, 502.1; 55/67, 386; 521/53, 140, 149

[56] References Cited

U.S. PATENT DOCUMENTS

| | | | |
|---|---|---|---|
| 3,873,514 | 3/1975 | Chu | 210/635 |
| 4,094,832 | 6/1978 | Soderberg | 210/635 |
| 4,094,833 | 6/1978 | Johansson | 210/635 |
| 4,118,347 | 10/1978 | Ishiguro | 521/53 |
| 4,322,310 | 3/1982 | House | 210/635 |
| 4,324,681 | 4/1982 | House | 210/635 |
| 4,505,822 | 3/1985 | Blomback | 210/635 |
| 4,522,724 | 6/1985 | Ramsden | 210/502.1 |
| 4,565,832 | 1/1986 | Kobashi | 210/635 |

FOREIGN PATENT DOCUMENTS 63947 11/1982 European Pat. Off. ......... 210/502.1

*Primary Examiner*—Ernest G. Therkorn
*Attorney, Agent, or Firm*—Oblon, Fisher, Spivak, McClelland, & Maier

[57] ABSTRACT

A method for producing a separating agent having a fluorine-containing group and a hydrophilic group, wherein a cross-linking component consisting of alkylene di(meth)acrylate and/or glycerine poly(meth)acrylate, and a principal chain component consisting of ester and/or ether having therein a polymerizable vinyl group or isopropenyl group and a functional group are subjected to suspension-polymerization to obtain a cross-linked copolymer, and then the functional group in the copolymer is subjected to chemical modification with a fluorine-containing compound or with both fluorine-containing compound and hydrophilic-group-containing compound. The separating agent of the present invention consists essentially of porous cross-linked copolymer particles having porosity in a range of from 0.5 to 3 ml/g and an average particle size in a range of from 1 to 2,000 μm.

10 Claims, 6 Drawing Figures

Feeding frequency

SEPARATING AGENT WITH FLUOROALKYL GROUP

This invention relates to a method for producing a separating agent useful for separating and refining any desired component out of a mixed solution containing various components, and also to such a novel separating agent obtained by such a production method. More particularly, the invention is concerned with a separating agent suitable for separating and refining a substance of a relatively high molecular weight such as protein, enzymes, saccharides, antibiotics, and other substances related to living organisms, and a method for producing such a separating agent.

It is to be noted that the term "separating agent" or "separator" as used throughout the present specification is meant by a broad concept of a substance which is employed in the separating operations such as, for example, ion-exchanged chromatography, gel-permeation chromatography, and so on, and which is usually called an adsorbent or chromatographic carrier.

As the organic type separator for use in the separation and the refinement of the biological-body-related substances, attention has so far been paid to those separators composed of dextran or agarose gel as the base material, particularly in the field of the separating operation with the affinity chromatographic method as the principal expedient for the operation.

However, the polysaccharide type separator such as the above-mentioned agarose gel has its own disadvantage such that its mechanical strength is inadequate, on account of which the separator is likely to be crushed within a separation column, even in any separation mode such as gel-permeation chromatography, adsorptive separation, and so forth, to result in increase in the pressure loss of a circulating feed liquid. Such a disadvantage becomes eminent particularly in a continuous operation over a long period of time in a large-scaled industrial separating process.

In view of the above-described disadvantages inherent in the heretofore known separator, it is the primary object of the present invention to provide an improved method of production of a separating agent having high mechanical strength, and suitable for separation of biological-body-related substances.

It is the secondary object of the present invention to provide a novel separating agent free from the above-described disadvantages.

It is still other object of the present invention to provide a novel separating agent adapted to various separation modes.

According to the present invention, the above-mentioned objects can be attained by a method for producing a separating agent having a fluoroalkyl-containing group and a hydrophilic group, the method comprising steps of obtaining porous cross-linked copolymer particles by suspension-polymerization of a cross-linking component consisting of alkylene di(meth)acrylate and/or glycerine poly(meth)acrylate and a principal chain component consisting of ester and/or ether having a polymerizable vinyl group or isopropenyl group and a functional group; and subsequently chemically modifying the functional group in the porous cross-linked copolymer with a compound containing fluorine or both compound containing fluorine and compound containing a hydrophilic group. The objects of the present invention can be further attained by the porous cross-linked copolymer particles having a particular chemical structure obtained by the above-mentioned method.

Various ways of carrying out the present invention are described in detail hereinbelow with reference to the accompanying drawings which are the graphical representations showing various properties of the separator obtained by the production examples of the present invention and that obtained by the comparative production example.

DESCRIPTION OF THE PREFERRED EMBODIMENTS

Figure 1:
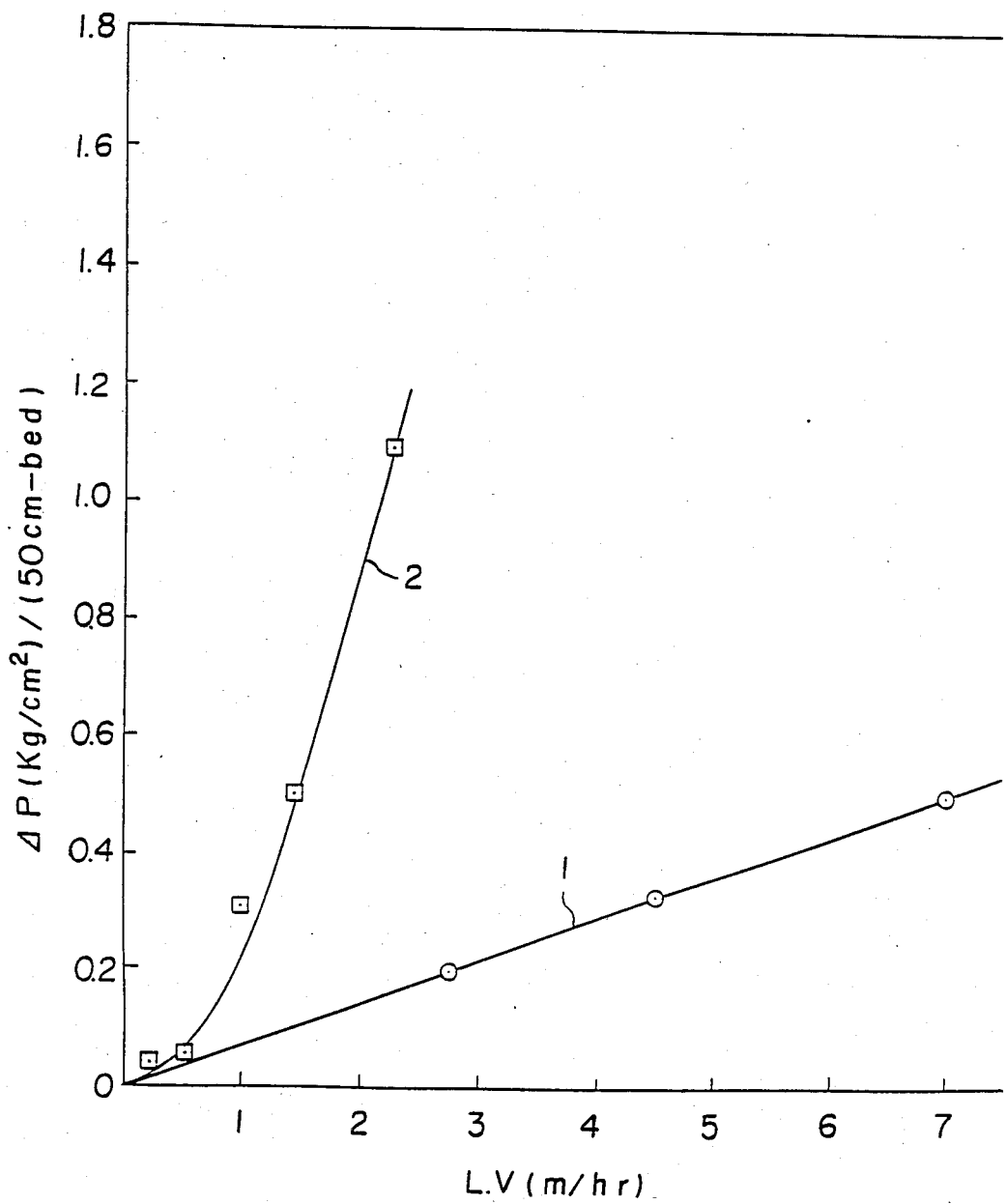
FIG. 1 is a graphical representation showing measured results of relationship between the pressure loss and the flow rate of circulation liquid by use of the separating agent obtained from Production Example 1 according to the present invention (curve (1)) and the cross-linked agarose gel obtained from Comparative Production Example (curve (2)), wherein the abscissa denotes the flow rate (m/hr.) of the circulation liquid and the ordinate represents the pressure loss ($kg/cm^2$-50 cm bed)

The method for the production of the separating agent according to the present invention comprises steps of first obtaining porous cross-linked copolymer particles by suspension polymerization of a monomeric substance of a particular component having a functional group, and then chemically modifying the functional group in the copolymer to introduce a fluoroalkyl-containing group and a hydrophilic group into it.

The monomeric substance to be used for the method of the present invention is a cross-linking component consisting of alkylene di(meth)acrylate and/or glycerine poly(meth)acrylate and a principal chain component consisting of an ester and/or ether having a polymerizable vinyl group or isopropenyl group and a functional group.

As the alkylene di(meth)acrylate, there may preferably used an ester of alkylene glycol containing 2 to 3 carbon or polyalkylene glycol having a degree of polymerization of 4 or below and acrylic acid or methacrylic acid. Particular examples of such alkylene di(meth)acrylate are: ethylene glycol diacrylate, ethylene glycol dimethacrylate, propylene glycol diacrylate, propylene glycol dimethacrylate, polyethylene glycol dimethacrylate, polypropylene glycol dimethacrylate, and so on. Of these, ethylene glycol di(meth)acrylate is typically used.

As the glycerine poly(meth)acrylate, there may be exemplified glycerine triacrylate, glycerine dimethacrylate, and so forth.

There is no particular limitation to the esters or ethers having a polymerizable vinyl group or isopropenyl group as well as a functional group, provided that the compounds are capable of introducing the fluoroalkyl-containing group and the hydrophilic group into the functional group of the copolymer by their reaction with a chemical modifier which will be mentioned later. Usually, those compounds containing an epoxy group and a hydroxyl group as the functional groups are used. For examples, there may be used such compounds selected from glycidyl ester of carboxylic acid (preferably containing 3 to 12 carbon atoms) having one polymerizable vinyl group or isopropenyl group, hydroxy alkyl ester of such carboxylic acid, and alkenyl glycidyl ether (containing preferably 3 to 12 carbon atoms) having one polymerizable vinyl group or isopropenyl group. Particular examples of such compounds are: glycidyl(meth)acrylate, allyl glycidyl ether, 2-hydroxy ethyl (meth)acrylate, and polyethyleneglycol monomethacrylate.

In the method of producing the separating agent according to the present invention, there is, first of all, manufactured porous cross-linked copolymer particles by suspension-polymerization of the above-described cross-linking component and the principal chain component. A ratio of the cross-linking component to be used is selected from a range of from 1 to 50% by weight, or preferably from 5 to 30% by weight with respect to the total composition.

The suspension-polymerization is carried out in accordance with the known method, in which the oil-in-water type polymerization is effected in the presence of an organic diluent, a polymerization initiator, and so on.

There is no particular limitation to the organic diluent to be used as the pore-producing agent, provided that it is inert to the above-mentioned functional group such as a glycidyl group, a hydroxyl group, and so on. Usually, there may be used benzene, toluene, ethylbenzene, chlorobenzene, n-octane, dichloroethane, cyclohexyl, n-octyl alcohol, n-dodecyl alcohol, dibutyl ether, diamyl ether, propyl acetate, butyl acetate, cyclohexanone, methyl isobutyl ketone, and so forth. These organic diluents may be used singly or in combination. Such a diluent is usually used in a quantity of from 0.05 to 3 parts by weight with respect to the total monomeric components.

As a polymerization initiator, there may be used dibenzoyl peroxide, diuraloyl peroxide, azobisisobutyronitrile, and so on. Such a polymerization initiator is usually used in a concentration ranging from 0.01 to 10% by weight.

Upon completion of the suspension-polymerization, the polymer is subjected to separation by filtration and washing, after which it is recovered as the porous cross-linked copolymer having in its side chain the functional group.

The porosity and average particle diameter of the porous cross-linked copolymer particles may be selected from a wide range of such parameters. Usually, the porosity of such copolymer particles ranges from 0.1 to 3 ml/g, or preferably from 0.3 to 2.0 ml/g on the dry basis, and the average particle diameter is in a range of from 1 to 2000 $\mu$m, preferably from 10 to 200 $\mu$m also on the dry basis.

In the subsequent step of the production method according to the present invention, the functional group of the thus obtained porous cross-linked copolymer particles is chemically modified with a fluorine-containing compound or with both fluorine-containing compound and hydrophilic-group-containing compound to introduce into it a fluoroalkyl-containing group and the hydrophilic group, which is the outstanding characteristic of the present invention.

In the present invention, the chemical modification is considered to be sufficiently effected, if the functional group contained in the copolymer reacts with the chemical modifier to be mentioned later to result in introduction into the copolymer of fluorine and/or the hydrophilic group, hence it is not always required that the chemical modifier per se contains a sufficient number of hydrophilic groups. For instance, as will be described hereinafter, in case 2-hydroxyethyl(meth)acrylate containing a hydroxyl group is used as the principal chain component of the copolymer, since the copolymer itself already contains the hydrophilic hydroxyl group, it may suffice that a part of the functional group in the copolymer be substituted by fluorine. In this case, therefore, a compound containing fluorine may be used as the chemical modifier.

Although, in the present invention, the chemical modification is effected on the porous cross-linked copolymer particles, the modification reaction per se is not different at all from the reaction on any low molecular weight organic compounds. Accordingly, the chemical modification intended in the present invention can be done by use of a well known reaction appropriately selected depending on the type of the functional group, hence there is no particular limitation to it.

Examples of the typical chemical modification to the functional group are as follows (a) In case the functional group is a hydroxyl group:

(i) A fluoroalkyl-group-containing carboxylic acid, an acid halide, or an acid anhydride is reacted with a part of the hydroxyl groups in the porous cross-linked copolymer particles. By the formation of the corresponding ester compound, fluoroalkyl groups are introduced into the copolymer. A typical example is a method of reacting a polyfluoroalkyl carboxylic acid such as trifluoroacetic acid with a part of the hydroxyl groups in the presence of a catalyst such as sulfuric acid, phosphoric acid, and so forth, as the case requires.

(ii) A fluoroalkyl-group-containing ketone and a part of the hydroxyl groups in the porous cross-linked copolymer are subjected to the addition reaction. By the formation of the corresponding ether compound, fluoroalkyl groups are introduced into the copolymer. A typical example of such a ketone is a polyfluoroacetone such as hexafluoroacetone.

(iii) A fluoroalkyl compound containing therein a leaving group such as halogen, tosyl group (-OTs), etc. is reacted with a part of the hydroxyl groups in the porous cross-linked copolymer particles. By the formation of the corresponding ether compound, fluoroalkyl groups are introduced into the copolymer.

(iv) A cyanate is produced by a well known method, in which use is made of cyanogen bromide (CNBr). With the thus obtained cyanate, a fluoroalkyl-group-containing carboxylic acid, alcohol, or else is reacted.

(b) In case the functional group is an epoxy group:

(i) A fluoroalcohol or fluoroglycol is reacted with the epoxy groups in the porous cross-linked copolymer particles in the presence of an acid or alkali catalyst. By the formation of the corresponding ether compound, fluoroalkyl groups are introduced into the copolymer, and, at the same time, hydroxyl groups are produced by the addition open-ring reaction. The representative fluorine-containing compounds are: 2,2,2-trifluoroethanol, 2,2,3,3,4,4,4-heptafluoro-1-butanol, hexafluoro-iso-propanol, and other polyfluoroalkyl alcohol; and tetrafluoroethylene glycol, and other polyfluoroalkyl polyol.

(ii) A fluoroalkyl-group-containing carboxylic acid, an acid halide, or an acid anhydride is reacted with the epoxy groups in the porous cross linked copolymer particles. By the formation of the corresponding ester compound, fluoroalkyl groups are introduced into the copolymer, and, at the same time, hydroxyl groups are produced. The representative fluorine-containing compound is trifluoroacetic acid.

(iii) An α-haloester, metal enolate derived from an active methylene, Grignard reagent, or the like is reacted with the epoxy groups in the porous cross-linked copolymer particles to introduce fluoroalkyl groups into the copolymer in the same manner as described in the foregoing, thereby producing hydroxyl groups.

Further, in the case of the functional group being the epoxy group, the above-mentioned chemical modification may be possibly effected on the total amount of the epoxy groups. On the other hand, however, it is preferable that such chemical modification reaction be carried out partially, and subsequently, the hydrophilic groups be introduced into the remainder of the epoxy groups with a compound which does not contain fluorine, but contains a hydrophilic group alone.

According to such two-stage treating method for the chemical modification, the ratio of introduction of the fluoroalkyl group and the hydrophilic group can be easily adjusted, whereby there can be readily obtained the porous cross-linked copolymer particles, on the surface of which both hydrophobic and hydrophilic properties are imparted at an appropriate ratio.

As the chemical modifiers to be used at the second stage reaction of the two-stage chemical modification treatment, where the hydrophilic group is to be introduced, there may be exemplified the following: water, ethylene glycol, propylene glycol, polyethylene glycol, glycerine, pentaerythritol, polyvinyl alcohol, and other polyhydric alcohols; glycidol and other epoxy-group-containing alcohols; and glucose, cyclodextrin, maltose, and other saccharides.

Further, as the catalysts, there may suitably be used sulfuric acid, phosphoric acid, perchloric acid, sodium hydroxide, and so forth.

In the chemical modification reaction, use of a solvent does not constitute an essential requirement. However, from the standpoint of uniformity in the reaction and the operational convenience thereof, coexistence of a solvent is preferable. The solvent to be used for this purpose should be selected from such substances that dissolve the fluorine-containing compounds and are also inert to the cross-linked copolymer having the functional groups as well as to the catalysts. Further, when a Lewis acid and metallic sodium are used as the catalyst, they must be used inevitably in the perfectly dried state. As such solvents, there may preferably be used ethers and hydrocarbons. Specific examples of such solvents are: dioxane, trioxane, tetrahydrofuran, benzene, toluene, xylene, dimethyl sulfoxide, and so forth.

The reaction temperature is usually 170° C. or below, or more preferably in a range of from 0° to 120° C. or so, taking into consideration of the heat resisting temperature of the cross-linked copolymer. The reaction time in any of the reactions is within 10 hours, which is generally sufficient, though it depends on the class of the catalyst used.

In the chemical modification according to the present invention, the optimum range of the ratio of fluorine to be introduced into the cross-linked copolymer is appropriately selected by the manner of using the separator such as the adsorbing agent, chromatographic carrier, and so on (the separation mode) or the kind of the component to be separated. In general, however, the fluorine content in the cross-linked copolymer is in a range of from 1 to 60% by weight. Also, there is no particular limitation to the ratio of the hydrophilic group. However, in the case of introducing the hydrophilic group into the functional group in the side chain of the cross-linked copolymer, it usually ranges from 10 to 90 mol % of the functional group.

The separating agent according to the present invention is manufactured by the above-described chemical modification, and is used in various separation modes, although the characteristic of the separator required of these various separation modes differs from mode to mode. When the separator is used as the gel-permeation chromatographic carrier, it is required to have less non-specific adsorption phenomenon with the biological-body-related substances. That is to say, it has been said that the interaction between protein, etc. and the base body of the separator is classified into the hydrophobic interaction, the hydrogen bonding, and the electrostatic interaction. When such interaction is considerable, there takes place such a phenomenon that, the separability of the substances is varied by the interaction other than the molecular size, even in the gel-permeation chromatography which is intended to separate one substance from the other due to a difference in their molecular sizes, with a consequential problem such that no expected separability is obtainable.

The non-peculiar adsorption phenomenon has something to do with selectivity at the time of separating the biological-body-related substances one another. As a result of such a phenomenon, however, neither sufficient separating function nor long serviceable life can be expected with the above-mentioned conventional separating agent.

Such a problem has not yet actually been solved to a satisfactory degree even in the conventionally known polysaccharide type separator as mentioned in the foregoing.

In accordance with the method according to the present invention, it is possible to obtain a separating agent, which exhibits less non-peculiar phenomenon, hence particularly suitable as the gel-permeation chromatographic carrier, by use of a fluorine-containing chemical modifier capable of introducing the straight chain fluoroalkyl group into a porous cross-linked copolymer particles, and by controlling the fluorine content in the porous cross-linked copolymer particles to a range of from 1 to 20% by weight. This control of the fluorine content can be easily attained by the afore-described two-stage chemical modification treatment, wherein it is preferable that fluorine is introduced into the copolymer by the chemical modification of from 10 to 70 mol %, or preferably from 20 to 50 mol %, of the functional group in the copolymer at the first stage reaction, and then the remainder of the functional group is substituted by the hydrophilic group at the second stage reaction.

On the other hand, when the separator is used as the adsorbing agent, it is required to have a large adsorptibility. According to the method of the present invention, there can be obtained a separating agent having high adsorptibility by use of a fluorine-containing chemical modifier capable of introducing a branched chain fluoroalkyl group into the porous cross-linked copolymer particles, and by controlling the fluorine content in the porous cross-linked copolymer particles to a range of from 10 to 60% by weight.

The separating agent to be obtained by the above-described method according to the present invention has itself a novel chemical structure. That is to say, it consists essentially of: the cross-linking component of alkylene di(meth)acrylate and/or glycerine poly(meth)acrylate; the fluoroalkyl-containing ester component represented by the following general formulae (1) and/or (2); and the glycerine derivative ester component and/or polyethylene glycol ester component represented by the following general formulae (3) and/or (4), the porosity of which is in a range of from 0.1 to 3 ml/g, or preferably from 0.3 to 2.0 ml/g, on the dry basis, and the average particle diameter of which is in a range of from 1 to 2000 μm, or preferably from 10 to 200 μm.

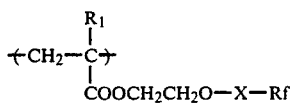
(1)

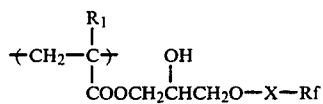
(2)

[In the above general formulae (1) and (2), $R_1$ denotes hydrogen or a methyl group; X represents a methylene group or a carbonyl group; and Rf designates a fluoroalkyl group containing less than 10 carbon atoms in a straight chain or branched chain form.]

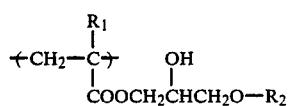
(3)

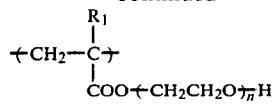
(4)

[In the above general formulae (3) and (4), $R_1$ represents hydrogen or a methyl group; $R_2$ denotes $-(CH_2CH_2O)_l H$ (where: l is an integer of from 0 to 10), $$-CH_2\overset{OH}{\underset{|}{CH}}CH_2OH,$$

$CH_2C(CH_2OH)_3$, —Glu (where: Glu is a residual group of glucose), —CD (where: CD is a residual group of cyclodextrin); or

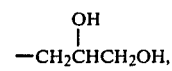

(where: m is an integer of 0 or 1); and n is an integer of from 1 to 4.]

Particularly preferable copolymers out of various porous cross-linked copolymers represented by the foregoing general formulae are those three kinds [I], [II] and [III], as follows. [I] Porous cross-linked copolymer particles consisting essentially of three structural units represented by the following general formulae (a), (b) and (c):

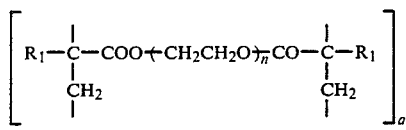

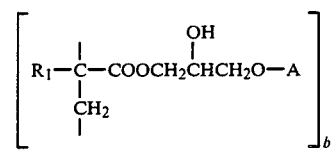

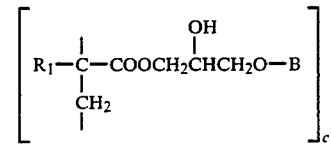

[In the above general formulae (a), (b) and (c), $R_1$ denotes hydrogen or a methyl group; n is an integer of from 1 to 3; A represents —$CH_2CF_3$, —$CH_2CF_2CF_2CF_3$, —$COCF_3$, —$COCF_2CF_2CF_3$, or —$CH(CF_3)CF_3$; B designates —H, —$CH_2CH_2OH$, —$CH_2CH(OH)CH_2OH$, —$CH_2C(CH_2OH)_3$, —Glu (where: Glu is a residual group of glucose), or —CD (where: CD is a residual group of cyclodextrin); and the mol fractions among a:b:c are 0.01 to 0.55:0.01 to 0.90:0.01 to 0.95, respectively.]

The above-mentioned porous cross-linked copolymer particles [I] contains the straight chain fluoroalkyl group, the fluorine content in the copolymer ranging from 1 to 20% by weight. This copolymer particles are suitable as the gel-permeation filtration chromatographic carrier. On the other hand, the porous cross-linked copolymer particles containing the branched chain fluoroalkyl group with the fluorine content therein ranging from 10 to 60% by weight is suitable as the adsorptive separator. [II] Porous cross-linked copolymer particles consisting essentially of three structural units represented by the following general formulae (a), (b) and (c):

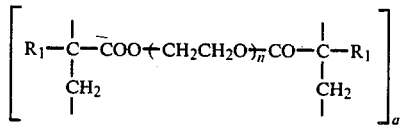

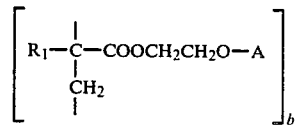

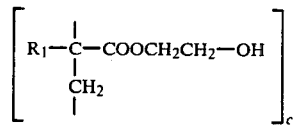

[In the above general formulae (a), (b) and (c), $R_1$ denotes hydrogen or a methyl group; n is an integer of from 1 to 3; A represents —$COCF_2CF_2CF_3$ or —$COCF_3$; the mol fractions among a:b:c are 0.01 to 0.55:0.01 to 0.70:0.10 to 0.95, respectively.][III] Porous cross-linked copolymer particles consisting essentially of three structural units represented by the following general formulae (a), (b) and (c):

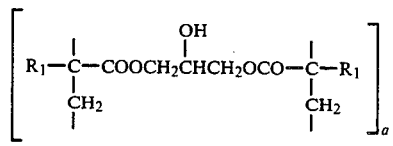

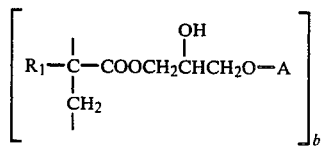

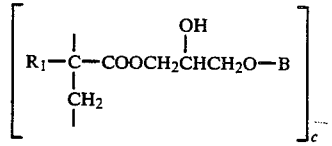

[In the above general formulae (a), (b) and (c), $R_1$ denotes hydrogen or a methyl group; A represents —$CH_2CF_3$, —$CH_2CF_2CF_2CF_3$, —$COCF_2CF_2CF_3$ or —$CH(CF_3)CF_3$; B designates —H, —$CH_2CH_2OH$, —$CH_2CH(OH)CH_2OH$; the mol fractions among a:b:c are 0.01 to 0.55:0.01 to 0.90:0.01 to 0.95, respectively.]

In the above-described porous cross-linked copolymers [II] and [III], the one containing fluorine in a range of from 1 to 20% by weight is particularly suited as the separator for the gel-permeation chromatography.

While the separating agent according to the present invention is adopted for the industrial separation process of protein and various other biological-body-related substances, it may, of course, be useful as the means for analysis.

Although the actual separation method depends on the separation mode in either of the above-mentioned cases, it can be practiced in accordance with the specific method to be adopted in every field. For instance, in the case of the gel-permeation chromatography, a buffer liquid same as an eluent is circulated in a separation column filled with the separating agent to bring them into equilibrium, and then a sample with a component to be separated having been dissolved therein is charged in the separation column, after which the eluent is circulated at a constant flow rate to elute the component to be separated.

Since the separating agent according to the present invention is extremely small in its swelling and contraction, various sorts of aqueous solutions having different ionic strength and pH values or various kinds of organic solvents can possibly be used as the eluent, which advantageously affords the separating agent a wide range of its application. Incidentally, the maximum displacement limit molecular weight of the chromatographic carrier consisting of the separating agent according to the present invention is approximately 2,000,000.

On the other hand, in the case of the adsorptive separation, the component for separation as adsorbed in the above-mentioned column filled with the separator is separated by elution in an appropriate expedient. As the method for elution, there may be employed a method of decreasing the ionic strength of the eluent, or a method of using an eluent, in which an organic solvent or a surfactant has been dissolved, or others.

In the following, the present invention will be explained in more detail with reference to practical production examples.

[PRODUCTION EXAMPLE 1]

Into a four-necked flask of 1 liter capacity equipped with a condensing tube, a thermometer and an agitator, 450 ml of ion-exchanged water, 15 g of sodium chloride, and 150 ml of 2% aqueous solution of polyvinyl alcohol were added and agitated. To this mixture, there was further added a mixture solution consisting of 20 g of ethylene glycol dimethacrylate, 65 g of glycidyl methacrylate, 50 g of n-octanol, 50 g of cyclohexanol, and 1.0 g of benzoyl peroxide as the polymerization initiator. Then, the polymerization reaction was carried out under agitation at a temperature of 90° C. for nine hours to obtain a copolymer. This polymeric substance was sufficiently washed with water, methanol, and water, in the order as mentioned. The rate of yield of the polymer, after its drying, was 97.5%, and its average particle diameter was 150 μm. The thus obtained resin assumed white, porous spherulite with porosity of 0.97 ml/g-R.

Subsequently, 60 ml of 1,4-dioxane and 15.0 g of the above-mentioned polymer were charged into a four-necked flask of a 300 ml capacity under the current of nitrogen gas ($N_2$), and mixed under agitation at 50° C. for 20 minutes. Into this mixture, there were added 5 g of 2,2,2-trifluoroethanol and 0.15 g of metallic sodium, and reaction was carried out at 80° C. for two hours. Thereafter, the temperature of the reaction solution was lowered to 50° C., into which 10 g of glycerol and 0.5 ml of concentrated sulfuric acid were added to be agitated for one hour at 50° C., thereby adding glycerol to the remainder of the functional group in the side chain. As the result, there was obtained a fluorine-containing polymer. The elementary analysis of the fluorine-containing polymer indicated the following values: 52.8% carbon, 6.4% hydrogen, and 7.5% fluorine. Also, each of the mol fraction of the cross-linking component (a), the principal chain component containing fluoroalkyl groups (b), and the hydrophilic principal chain component containing no fluoroalkyl group (c) was 0.18, 0.24 and 0.58, respectively.

Measurement of Pressure Loss

Into a glass column having an inner diameter of 10 mm $\phi$ (equipped with a jacket), 40 ml of the separating agent obtained in the Production Example 1 with its particle size having been regulated to a range of from 74 to 208 microns. The layer thickness of the separator was 50 cm. The column was maintained at a temperature of 25° C. with circulating water, and a buffer solution of 0.05 mol/l phosphoric acid (pH value of 7.0) was caused to flow at a constant flow rate from the top of the column. When the charged layer of the separating agent became stabilized and the indicator needle of a pressure gauge mounted on the top part of the column became steady, the graduation of the pressure gauge was read. From this read value, there was subtracted a value obtained by reading of the pressure gauge when the exactly same operations as mentioned above were carried out in the state of the glass column having been empty, i.e., not having been filled with the separating agent, thereby finding out the pressure loss ($\Delta p$; unit of measurement being kg/cm$^3$/50 cm-bed).

When the flow rate (LV: linear velocity, unit of measurement: m/hr.) was varied to measure the pressure loss ($\Delta p$), there were obtained the results as shown by a rectilinear line (1) in FIG. 1. It will be seen from this graphical representation that, within the range of the measured flow rate (LV=7 m/hr or less), there was established a linear relationship between the pressure loss ($\Delta p$) and the flow rate (LV) in the case of using the separating agent according to the present invention, hence there could be observed neither deformation nor crushing of the carrier particles, even if the liquid circulation was done at a high flow rate of LV=7 m/hr.

For the sake of comparison, the exactly same operations as mentioned above were conducted with the exception that cross-linking agarose gel was used in place of the separating agent obtained from Production Example 1 above, from which the relationship between the pressure loss ($\Delta p$) and the flow rate (LV) was found. The results are as shown by a curve (2) in FIG. 1.

In the case of using the cross-linking agarose gel, the pressure loss ($\Delta p$) began to rise up abruptly from about a point where the flow rate (LV) exceeds 1 m/hr., and, with the flow rate (LV) of 2.5 m/hr. or higher, the liquid circulation became impossible.

[PRODUCTION EXAMPLE 2]

Into a four-necked flask of 300 ml capacity, 60 ml of 1,4-dioxane and 15.0 g of the same polymer as obtained form Production Example 1 above were charged under the current of nitrogen gas (N$_2$), and the batch was agitated at 50° C. for 20 minutes. Thereafter, 4.0 g of 2,2,3,3,4,4,4-heptafluoro-1-butanol and 0.15 g of metallic sodium were added to this mixture solution to carry out the reaction at 80° C. for two hours. After this, the temperature of the mixture solution was lowered to 50° C., and 80 ml of 5% aqueous solution of sulfuric acid was added to this mixture solution to hydrolyse the remainder of the functional group in the side chain. As the result, there was obtained a fluorine-containing polymer of the following elementary analytical values: 48.0% carbon, 5.2% hydrogen, and 13.5% fluorine. Also, the mol fraction of each of the cross-linking component (a), the principal chain component containing fluoroalkyl groups (b), and the hydrophilic principal chain component containing no fluoroalkyl group (c) was 0.18, 0.25 and 0.57, respectively.

[PRODUCTION EXAMPLE 3]

The exactly same operations as in Production Example 1 above were conducted with the exception that glucose was used in place of glycerol in the Production Example 1, as the hydrophilic compound. The elementary analysis of the resulted fluorine-containing polymer was as follows: 50.01% carbon, 6.67% hydrogen, and 3.41% fluorine (a=0.18, b=0.16, c=0.66).

[PRODUCTION EXAMPLE 4]

Into a four-necked flask of 300 ml capacity, there were charged 60 ml of 1,4-dioxane and 14.8 g of the same polymer as obtained from Production Example 1 above under the nitrogen gas (N$_2$) current, and the batch was agitated at 50° C. for 20 minutes. To this mixture solution, 4.0 g of 2,2,3,3,4,4,4-heptafluorobutanol and 0.15 g of metallic sodium were added, and the reaction was conducted at 80° C. for two hours. After completion of the reaction, dioxane solution was removed and the residual polymer was washed on filter paper with dry dioxane. The thus washed polymer was again returned into the flask with further addition of 50 ml of dioxane and 10 g of glycerol, to which 5 ml of dioxane solution of 10% sulfuric acid was slowly dropped. The reaction was continued for four hours at 50° C., during which glycerol was introduced into the residual epoxy group, thereby obtaining fluorine-containing polymer having the following elementary analytical values: 52.37% carbon, 6.70% hydrogen, and 5.67% fluorine (a=0.18, b=0.52, c=0.48).

[PRODUCTION EXAMPLE 5]

Into a four-necked flask of 300 ml capacity, there were charged 60 ml of dry 1,4-dioxane and 14.9 g of the same polymer as obtained from Production Example 1 above under the nitrogen gas (N$_2$) current, and the batch was agitated for 20 minutes at a temperature of 50° C. To this mixture solution, 4.7 g of 2,2,2-trifluoroethanol and 40.12 g of metallic sodium were added, and the reaction was carried out for two hours at 80° C. After completion of the reaction, dioxane solution was removed and the residual polymer was dried on filter paper and then washed with dimethyl sulfoxide (DMSO) solution. Thereafter, the polymer was returned to the flask with addition of 70 ml of DMSO and 8.8 g of pentaerythritol, to which 5 ml of dioxane solution of 10% sulfuric acid was slowly dropped. The reaction was then continued for four hours at 50° C., during which glycerol was introduced into the residual epoxy group. As the result, there was obtained fluorine-containing polymer of the following elementary analytical values: 50.60% carbon, 6.27% hydrogen, and 7.84% fluorine (a=0.18, b=0.35, c=0.47).

[PRODUCTION EXAMPLE 6]

The exactly same operations as in Production Example 1 above were conducted with the exception that water was used in place of glycerol as the hydrophilic compound in Production Example 1. The resulted fluorine-containing polymer had the following elementary analytical values: 51.62% carbon, 6.28% hydrogen, and 7.22% fluorine (a=0.18, b=0.25, and c=0.57).

[PRODUCTION EXAMPLE 7]

The exactly same operations as in Production Example 5 above were conducted with the exception that use was made of 2,2,3,3,4,4,4-heptafluorobutanol as the fluoroalkyl-group-containing compound and β-cyclodextrin as the hydrophilic compound. The resulted fluorine-containing polymer had the following elementary analytical values: 50.53% carbon, 6.50% hydrogen, and 3.32% fluorine (a=0.18, b=0.22, and c=0.60).

[PRODUCTION EXAMPLE 8]

Into a four-necked flask, there were charged 60 ml of 1,4-dioxane and 15.0 g of the same polymer as obtained from Production Example 1 above, and the batch was agitated for 20 minutes at 50° C. To this mixture solution, 7 ml of dioxane solution, into which 2.1 g of perfluorolactic acid had been dissolved, was dropped, and the reaction was continued for two hours at 80° C. After completion of the reaction, dioxane solution was removed and the residual polymer was returned to the flask with addition of 50 ml of 10% aqueous solution of sulfuric acid, and the mixture was agitated for five hours at 50° C. After completion of the reaction, the polymer was sufficiently washed with water to thereby obtain fluorine-containing polymer. The thus obtained fluorine-containing polymer had the following elementary analytical values: 52.15% carbon, 6.03% hydrogen, and 5.32% fluorine (a=0.18, b=0.07, c=0.75). Further, the infrared ray absorption spectrum derived from the fluoroalkyl-containing group in the polymer was 1785 cm$^{-1}$

[PRODUCTION EXAMPLE 9]

The exactly same procedures as in Production Example 8 above were followed with the exception that use was made of glycerol in place of water as the hydrophilic compound in Production Example 8. The resulted fluorine-containing polymer had the following elementary analytical values: 51.6% carbon, 6.6% hydrogen, and 6.9% fluorine (a=0.18, b=0.13, and c=0.69). Further, the infrared ray absorption spectrum of the polymer due to the fluoroalkyl-containing group therein was 1785 cm$^{-1}$

[PRODUCTION EXAMPLE 10]

Into a four-necked flask of 300 ml capacity equipped with a condensing tube, a thermometer, an agitator, and an N$_2$ gas feed tube, there were charged 16.81 g of sodium chloride, 368 ml of ion-exchanged water, and 200 ml of 2% aqueous solution of polyvinyl alcohol, and the batch was agitated. To this mixture solution, there was further added a mixture solution consisting of 64.01 g of glycidyl methacrylate, 16.03 g of triethylene glycol dimethyacrylate, 68.75 g of toluene, and 1.227 g of benzoyl peroxide as the polymerization initiator. The polymerization reaction was conducted for nine hours at 85° C. in the nitrogen atmosphere to obtain a copolymer. The resulted polymer was sufficiently washed for three times with water and methanol in the order as mentioned. When dried, there was obtained white porous spherulitic resin at a rate of polymerization of 92% and with porosity of 0.76 ml/g.

Subsequently, 12.852 g of the thus obtained polymer, 60 ml of 1,4-dioxane (distilled solvent was used after drying with metallic sodium), 290 mg of metallic sodium, and 4.373 g of 2,2,2-trifluoroethanol were charged into a four-necked flask of 200 ml capacity, and the reaction was continued for 2.5 hours at 90° C. After completion of the reaction, dioxane solution was removed, and the residual polymer was washed with dry dioxane. This polymer was returned to the flask with addition of 70 ml of dioxane solution, into which 6.234 g of glycerol had been dissolved. To this mixture, 5.0 ml of dioxane solution containing 0.70 ml of concentrated sulfuric acid was dropped, and the reaction was conducted for five hours at 50° C. After completion of the reaction, dioxane solution was removed and the residual polymer was washed with water. The polymer had the following elementary analytical values: 49.2% carbon, 6.5% hydrogen, and 11.5% fluorine (a=0.11, b=0.49 and c=0.40).

[PRODUCTION EXAMPLE 11]

The exactly same procedures as in Production Example 10 above were followed with the exception that 2,2,3,3,4,4,4-heptafluorobutanol was used in place of 2,2,2-trifluoroethanol as the fluoroalkyl-group-containing compound in Production Example 10. The resulted fluorine-containing polymer had the following elementary analytical values: 50.6% carbon, 6.9% hydrogen, and 8.3% fluorine (a=0.11, b=0.16, and c=0.73).

[PRODUCTION EXAMPLE 12]

Into a four-necked flask of 300 ml capacity equipped with a condensing tube, a thermometer, an agitator, and an N$_2$ gas feed tube, there were added 4.60 g of sodium chloride, 86 ml of ion-exchanged water, and 42 ml of 2% aqueous solution of polyvinyl alcohol, and then the batch was agitated. To this mixture solution, there was further added a mixture solution consisting of 19.3 g of glycidyl methacrylate, 6.23 g of glycerol dimethacrylate, 21.1 g of 1-octanol, 7.20 g of cyclohexanol, and 270 mg of benzoyl peroxide as the polymerization initiator. Then, the reaction was continued for nine hours at 85° C. in the nitrogen atmosphere, from which a copolymer was obtained. The resulted polymer was sufficiently washed for three times with water and methanol in the order as mentioned. Upon drying, there was obtained white porous spherulitic resin at a rate of polymerization of 94.7% and with porosity of 0.67 ml/g.

Subsequently, 20.3 g of the thus obtained polymer in its dried condition, 95 ml of 1,4-dioxane, and 3.01 g of 2,2,2-trifluoroethanol were charged into a four-necked flask of 200 ml capacity in the nitrogen atmosphere, and the batch was agitated for 20 minutes at a temperature of 50° C. Thereafter, to this mixture, 0.34 g of sodium hydride (50% content) was added and the reaction was carried out for 2.5 hours at 80° C. After completion of the reaction, dioxane solution used for the reaction was removed by filtration, and the residual polymer was put back again into the flask with addition of 100 ml of 10% aqueous solution of sulfuric acid to continue the reaction for six hours at a temperature of 50° C. After the reaction, the reaction solution was cooled, followed by filtration and washing with water of the polymer, thereby obtaining the above-mentioned fluorine polymer separator having the following elementary analytical values: 51.4% carbon, 6.9% hydrogen, and 8.2% fluorine (a=0.17, b=0.27, and c=0.56).

[PRODUCTION EXAMPLE 13]

Into a four-necked flask of 300 ml capacity equipped with a condensing tube, a thermometer, an agitator, and an $N_2$ gas feed tube, there were charged 39.595 g of calcium chloride dihydrate, 46.5 ml of 2% aqueous solution of polyvinyl alcohol, and 86.5 ml of ion-exchanged water, and the batch was agitated. To this mixture solution, there was further added a mixture solution consisting of 13.99 g of 2-hydroxy methacrylate, 6.06 g of ethylene glycol dimethacrylate, 19.96 g of cyclohexanol, 7.83 g of 1-dodecanol, and 257 mg of benzoyl peroxide. Then, the reaction was conducted for nine hours at a temperature of 85° C. in the nitrogen atmosphere, thereby obtaining a copolymer. The thus obtained copolymer was washed with water and methanol in the order as mentioned. Upon drying, there was obtained white porous resin at a rate of polymerization of 95.2% and with porosity of 0.53 ml/g.

Subsequently, 9.79 g of the above-mentioned polymer in its dried condition, 52 ml of dioxane in dried condition, and 3.16 g of perfluorolactic acid were charged into a four-necked flask of 200 ml capacity, and the reaction was conducted for ten hours by refluxing of the reactants under heat. After completion of the reaction, the polymer was sufficiently washed with water to obtain the above-mentioned fluorine-containing copolymer separator. This fluorine-containing polymer had the elementary analytical values of 52.3% carbon, 6.7% hydrogen, and 6.4% fluorine (a=0.22, b=0.08, and c=0.70). The infrared ray absorption spectrum of this polymer due to the fluorine-containing compound present therein was 1785 cm$^{-1}$ (carbonyl group).

[PRODUCTION EXAMPLE 14]

Into a four-necked flask of 300 ml capacity equipped with a condensing tube, a thermometer, an agitator, and an $N_2$ gas feed tube, there were charged 13.232 g of sodium chloride, 86.5 ml of ion-exchanged water, and 47 ml of 2% aqueous solution of polyvinyl alcohol, and the batch was agitated. To this mixture solution, there was further added a mixture solution consisting of 8.100 g of glycidyl methacrylate, 6.077 g of polyethylene glycol methacrylate ("PE-200" a product of Nippon Oil and Fat Co., Ltd., having a mean molecular weight of from 261 to 303), 6.076 g of ethylene glycol dimethacrylate, 19.6 g of methyl isobutyl ketone, and 322 mg of benzoyl peroxide. Then, the reaction was conducted for nine hours at a temperature of 85° C. in the nitrogen atmosphere, as the result of which a copolymer was obtained. The resulted polymer was sufficiently washed with water and methanol in the order as mentioned. Upon drying, there was obtained white porous resin at a rate of polymerization of 93.6% and with porosity of 0.97 ml/g.

Subsequently, 10.12 g of the above-mentioned polymer, 55 ml of dried 1,4-dioxane, and 2.79 g of perfluoro butyric acid were subjected to reaction for four hours at 80° C. After completion of the reaction, the polymer was sufficiently washed with water to thereby obtain the above-mentioned fluorine-containing polymer separator. The polymer in its dried condition was found to have slight water-repllent property. The elementary analysis of this fluorine-containing polymer indicated that the substance was composed of the following elements: 46.8% carbon, 5.4% hydrogen, and 16.9% fluorine (a=0.3, b=0.3, and c=0.4). The infrared ray absorption spectrum of this polymer due to the presence of the fluorine compound was 1785 cm$^{-1}$ (carbonyl group).

[PRODUCTION EXAMPLE 15 (COMPARATIVE)]

10.4 g of white porous resin obtained in Production Example 1 above was charged into a flask, to which 60 ml of 0.5% aqueous solution of sulfuric acid was added. The batch was then agitated for seven hours at 70° C. to open the epoxy ring of the resin, thereby obtaining a polymer containing therein vis-diol compound. The elementary analytical values of this polymer were as follows: 52.26% carbon and 6.67% hydrogen (a=0.18 and c=0.82).

[PRODUCTION EXAMPLE 16 (COMPARATIVE)]

The exactly same procedures as in Production Example 15 were followed with the exception that glycerol was used in place of water as the hydrophilic compound in Production Example 15. The elementary analytical values of this polymer were as follows: 52.06% carbon and 6.78% hydrogen (a=0.18 and c=0.82).

[Protein Adsorption Test (Batch Method)]

(1) Separating agent: copolymer particles obtained in Production Examples 1, 3, 4, 10, 13 and 15.

(2) Protein: bovine serum γ-globulin; bovine serum albumin (produced by Sigma Co., Ltd.).

(3) Measurement of adsorptibility:

0.20% by weight each of 0.10M tris-hydrochloric acid buffer solution (pH value of 7.5) of γ-globulin and albumin was prepared. To this buffer solution, ammonium sulfate of the purest quality was added, by which 100 ml each of solutions having different concentration of ammonium sulfate was prepared. On the other hand, 5.00 ml each of the above-mentioned separating agents was buffered by the buffer solution. The thus treated separators were deprived of attached water by means of a centrifugal machine, after which these separators were each added to the above-mentioned prepared solutions. These mixture solutions were left to stand for 12 hours at a temperature of 5° C., after which they were shaked by a shaking machine for six hours at 10° C. (100 spm at 4 cm stroke). After completion of the shaking, each of the solutions was filtered, and the filtered liquid was subjected to measurement for its light absorbance (optical density) at 280 nm to thereby calculate the weight of protein adsorbed onto the separating agent from its calibration curve.

(4) Results: as shown in Tables 1 through 8 below.

TABLE 1

Quantity of adsorption of γ-globulin (mg/ml-R) of fluorine-containing polymer obtained in Production Example 4

| (NH$_4$)$_2$SO$_4$ concentration (%) | 0.0 | 2.50 | 5.00 | 7.50 | 10.0 |
|---|---|---|---|---|---|
| Production Example 4 | 1.6 | 0.3 | 2.2 | 3.1 | 4.7 |

TABLE 2

Quantity of adsorption (mg/ml-R) of γ-globulin of polymer obtained in Production Example 15

| (NH$_4$)$_2$SO$_4$ concentration (%) | 0.0 | 2.50 | 5.00 | 7.50 | 10.0 | 12.5 |
|---|---|---|---|---|---|---|
| Production Example 15 (comparative) | 1.2 | 1.3 | 2.7 | 5.8 | 10.1 | 15.4 |

TABLE 3

Quantity of adsorption (mg/ml-R) of γ-globulin by fluorine-containing polymer obtained in Production Example 1

| (NH$_4$)$_2$SO$_4$ concentration (%) | 0.0 | 2.5 | 5.0 | 7.5 | 10.0 | 12.5 |
|---|---|---|---|---|---|---|
| Production Example 1 | 1.9 | 0.1 | 0.5 | 1.2 | 2.3 | 3.0 |

TABLE 4

Quantity of adsorption (mg/ml-R) of γ-globulin by fluorine-containing polymer obtained in Production Example 3

| (NH$_4$)SO$_4$ concentration (%) | 0.0 | 2.5 | 5.0 | 7.5 | 10.0 | 14.0 |
|---|---|---|---|---|---|---|
| Production Example 3 | 2.9 | 0.8 | 1.2 | 1.4 | 2.6 | 7.0 |

TABLE 5

Quantity of adsorption (mg/ml-R) by bovine serum albumin of fluorine-containing polymer obtained in Production Example 1

| (NH$_4$)$_2$SO$_4$ concentration (%) | 0.0 | 2.5 | 7.5 | 12.5 | 16.5 | 21.0 | 27.0 | 37.0 |
|---|---|---|---|---|---|---|---|---|
| Production Example 1 | 0.0 | 0.0 | 0.9 | 1.5 | 2.7 | 3.9 | 5.5 | 8.5 |

TABLE 6

Quantity of adsorption (mg/ml-R) by bovine serum albumin of polymer obtained in Production Example 15

| (NH$_4$)$_2$SO$_4$ concentration (%) | 0.0 | 2.5 | 7.5 | 12.5 | 17.5 | 25.0 |
|---|---|---|---|---|---|---|
| Production Example 15 (Comparative) | 0.0 | 0.0 | 0.9 | 2.24 | 4.56 | 9.98 |

TABLE 7

Quantity of adsorption (mg/ml-R) of γ-globulin by fluorine-containing polymer obtained in Production Example 13

| (NH$_4$)$_2$SO$_4$ concentration (%) | 0.0 | 2.5 | 5.0 | 7.5 | 10.0 | 12.5 |
|---|---|---|---|---|---|---|
| Production Example 13 | 1.7 | 0.8 | 1.6 | 3.1 | 4.9 | 6.7 |

TABLE 8

Quantity of adsorption (mg/ml-R) of γ-globulin by fluorine-containing polymer obtained in Production Example 10

| (NH$_4$)$_2$SO$_4$ concentration (%) | 0.0 | 2.5 | 5.0 | 7.5 | 10.0 | 12.5 |
|---|---|---|---|---|---|---|
| Production Example 10 | 1.7 | 0.4 | 0.9 | 1.6 | 2.9 | 5.1 |

[Measurement of Protein Recovery (Column Method)]

Conditions for measurement

Separator: copolymer particles obtained in Production Example 1

Particle size of resin: 88 to 105 μm

Separation column: 10 mm (inner dia.)×96 cm (height) (75.4 ml bed)

Eluent: 0.1M phosphate buffer solution (pH 7.40)

Flowrate: 1.01 ml/min.

Protein: as shown in Table 9 below (product of Sigma Co., Ltd.)

Charging quantity of protein: 2.0 ml (300 mg) of 1.5% solution of protein

Detection method: ultraviolet having wavelength of 280 nm

Under the above-mentioned conditions, the rate of recovery of protein was measured. In more detail, the protein solution was charged into the column filled with the separating agent, and the protein was eluted by use of the above-mentioned eluent at a flow rate of 1.01 ml/min. The protein as eluted was totally recovered into a volumetric flask. Then, the optical density of the solution was measured at 280 nm and the weight of the eluted protein was calculated using the calibration curve (optical density vs. concentration of protein solution) which was measured beforehand. The same operations were repeated three times to find out an average rate of recovery. The results are as shown in Table 9 below.

TABLE 9

| Protein | Recovery Rate of Protein Recovery rate (%) |
|---|---|
| Human serum albumin | 99 |
| Bovine serum albumin | 96 |
| Hemoglobin | 93 |
| Ovalbumin | 99 |
| Myoglobin | 96 |
| α-lactalbumin | 97 |
| Thyroglobulin | 90 |
| Bovine serum γ-globulin | 91 |

(MEASUREMENT EXAMPLE 1)

The separating agents obtained in Production Example 1 and 16 were sieved to regulate their particle size in a range of from 88 to 105 μm, and then each of them was filled in a glass column having an inner diameter of 10 mm (75 ml). On the other hand, protein having different molecular weights as shown hereinbelow was dissolved into 1/20 M phosphate buffer solution (pH 7.40) so as to have concentration of 2%, after which 50 ml of such solution was charged into the glass column which had been sufficiently equilibrated in advance with 1/20 M phosphate buffer solution (pH value of 7.40) containing therein 150 mM of NaCl. After pouring the solution into the column, the 1/20 M phosphate buffer solution containing therein 150 mM of NaCl was caused to flow at a flow rate of 1.01 ml/min., thereby eluting protein. Detection of the protein was done by use of an UV meter (at 280 nm).

From the eluted position of protein, the values of Kav. were found in accordance with the following equation, the values of which were plotted against molecular weight. As the results, calibration curves as shown in FIGS. 2 and 3 were obtained.

$$Kav. = \frac{Ve - Vo}{Vt - Vo}$$

(where: Vt is the total volume (ml) of the separating agent; Ve is a volume (ml) of elution; and Vo is a volume (ml) of displacement, the value Vo having been found by use of blue dextran having a molecular weight of approximately 2,000,000).

Figure 2:
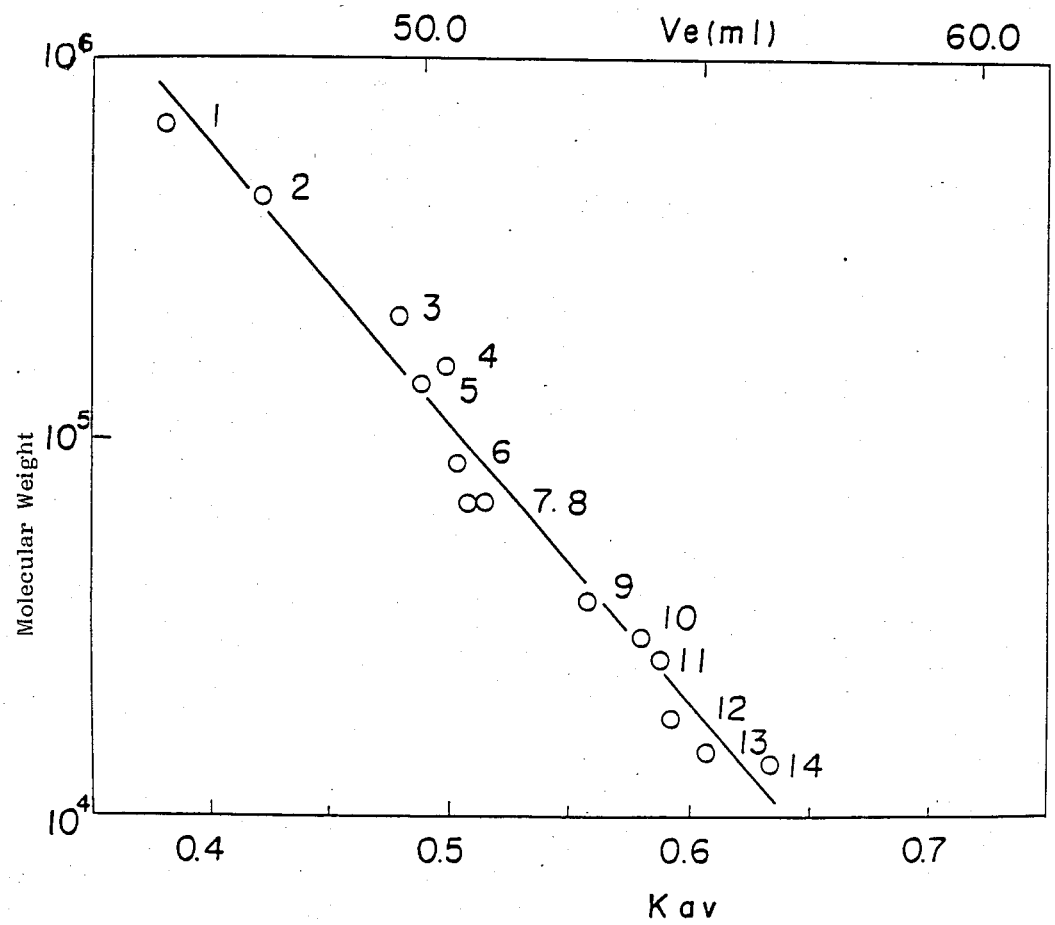
FIG. 2 is a graphical representation showing a protein calibration curve (Measurement Example 1) for the separating agent obtained from Production Example 1 according to the present invention, wherein the abscissa denotes a value Kav. represented by the following equation, and the ordinate denotes the molecular weight: Kav.=Ve−Vo/Vt−Vo (where: Vt is the total volume (ml) of the separating agent; Ve is a volume (ml) of elution; and Vo denotes a volume (ml) of displacement, which is a value obtained by use of blue dextran having a molecular weight of approximately 2,000,000)
Figure 3:
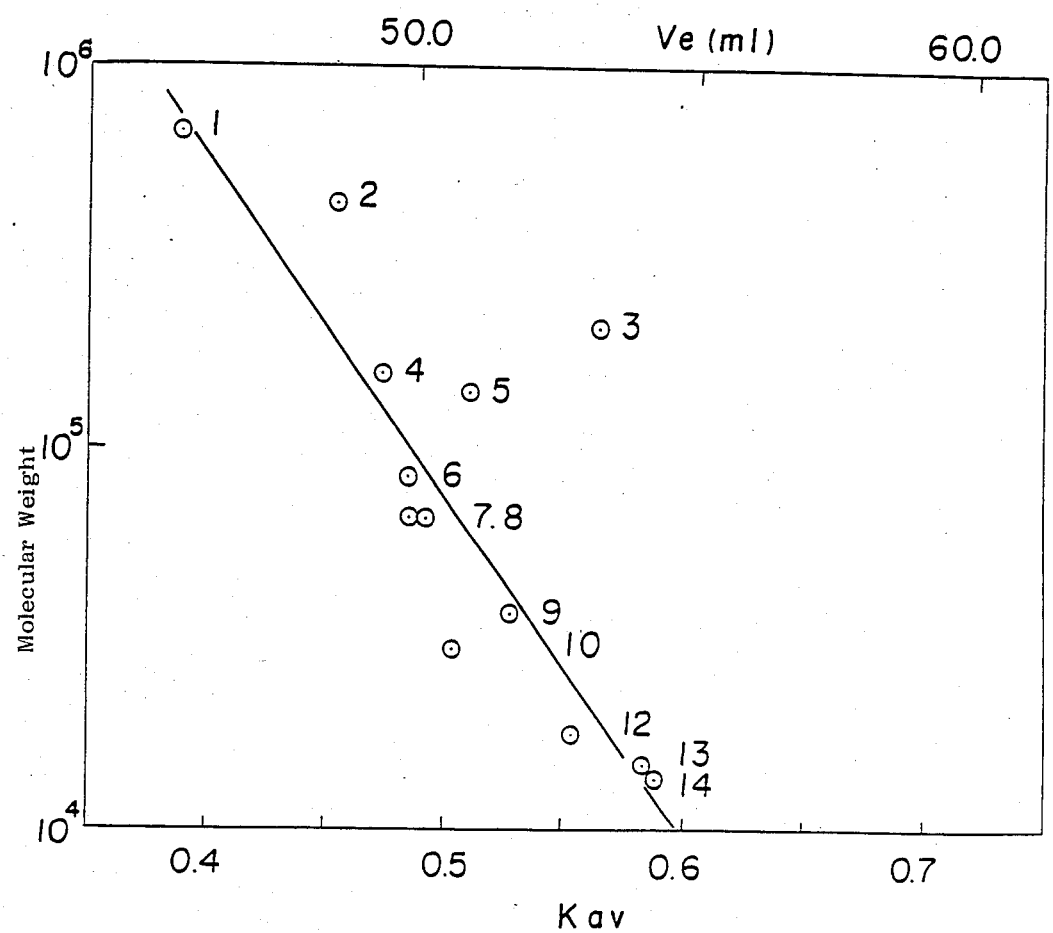
FIG. 3 is a graphical representation also showing a protein calibration curve (Measurement Example 1) for the separating agent obtained from Production Example 16 (comparative example), wherein both abscissa and ordinate represent the same parameters as in FIG. 2 above.

From FIG. 2, it will be seen that the calibration curve obtained by use of the separator according to the present invention indicates good rectilinearity, hence it is suitable as the carrier for the gel filtration chromatography.

| Protein | Molecular Weight ($\times 10^3$) | Equi-potential Point |
|---|---|---|
| 1. Thyroglobulin | 667 | 4.5 |
| 2. Ferritin | 440 | 4–5 |
| 3. Catalase | 210 | 5.5 |
| 4. Aldolase | 158 | 5.1–5.3 |
| 5. Alcohol dehydrogenated enzyme | 140 | 8.5–10.0 |
| 6. Transferrin | 80–90 | 5.3 |
| 7. Human serum albumin | 66.5 | 4.6–4.9 |
| 8. Bovine serum albumin | 66.3 | 4.6–4.8 |
| 9. β-lactoglobulin | 36.8 | 5.1 |
| 10. β-lactocidase | 29–30 | 5.3–5.9 |
| 11. Chymotripsinogen | 25.7 | 9.5 |
| 12. Myoglobin | 17.8 | 8.1–8.2 |
| 13. α-lactalubmin | 14.4 | 4.1–4.8 |
| 14. Ribonuclease | 13.7 | 9.5–9.7 |

[PRODUCTION EXAMPLE 17]

Into a four-necked flask of 1 liter capacity equipped with a condensing tube, a thermometer, and an agitator, there were charged 450 ml of ion-exchanged water, 15 g of sodium chloride, and 150 ml of 2% aqueous solution of polyvinyl alcohol, and the batch was agitated. To this mixture solution, there was further added a mixture solution consisting of 22 g of ethylene glycol dimethacrylate, 65 g of glycidyl methacrylate, 50 g of n-octanol, 50 g of cyclohexanol, and 1.0 g of benzoyl peroxide (BPO) as the polymerization initiator. The polymerization reaction was continued for nine hours at a temperature of 90° C. under agitation, thereby obtaining a copolymer. The thus obtained polymer was sufficiently washed with water, methanol and again water in the order as mentioned. After drying, there was obtained white porous spherulitic resin at a rate of polymerization of 97.5% and with an average particle size of 150 μm. Porosity of the polymer was 0.97 ml/g.

Subsequently, 55 ml of dry 1,4-dioxane and 25.0 g of the above-mentioned polymer were charged into a four-necked flask of 300 ml capacity under nitrogen ($N_2$) current, and the batch was agitated for 20 minutes at 50° C. To this reaction mixture, 15 g of hexafluoro isopropanol and 0.53 g of metallic sodium were added, and the reaction was conducted for three hours at 80° C. After completion of the reaction, the polymer was filtered and washed. Following these treatments, the polymer was put back again into the flask of 300 ml capacity with addition of 100 ml of 10% aqueous solution of sulfuric acid, and the batch was reacted for one hour at 50° C. Upon completion of the reaction, the polymer was sufficiently washed with water, methanol and again water in the order as mentioned. The fluorine content of the polymer was 13.32% by weight. The infrared ray absorption spectrum of this fluorine-containing polymer due to the fluorine compound was as follows.

KBr tablet method . . . 740 cm$^{-1}$ (sharp & small); 690 cm$^{-1}$ (sharp & medium).

Also, the mol fractions of (a), (b) and (c) were 0.20, 0.24, and 0.56, respectively.

[PRODUCTION EXAMPLE 18]

The exactly same procedures as in Production Example 17 above were followed with the exception that 25 g of hexafluoro isopropanol was used for the polymer having the functional group as obtained in Production Example 17 and the reaction was conducted at a temperature of 90° C. for eight hours. The resulted polymer had the following elementary analytical values and the infrared ray absorption spectrum.

Elementary analysis: 43.66% carbon, 4.42% hydrogen and 25.47% fluorine (the mol fractions of (a), (b) and (c) of 0.20, 0.55, 0.25, respectively).

Infrared ray absorption spectrum: KBr tablet method: 740 cm$^{-1}$ (sharp & small); 690 cm$^{-1}$ (sharp & medium).

[PRODUCTION EXAMPLE 19]

Into a four-necked flask of 300 ml capacity, there were charged under nitrogen current ($N_2$) 60 ml of dry 1,4-dioxane and 15.0 g of the polymer having the functional group as used in Measurement Example 1 above, and the batch was agitated for 20 minutes at 50° C. To this mixture solution, 16.8 g of hexafluoro isopropanol and 1.7 g of metallic sodium were added, and the mixture was subjected to reaction for three hours at a temperature of 80° C. The temperature of the solution was further lowered to 50° C., and then 5.0 g of glycerol and 20 ml of 1,4-dioxane solution containing therein 3 ml of sulfuric acid were slowly dropped into this reaction solution. Following this, the batch was agitated for one hour at 50° C. to add glycerol to the remaining functional group in the side chain, thereby obtaining fluorine-containing polymer. The fluorine content of this polymer was 21.95% by weight.

The infrared ray absorption spectrum of this fluorine-containing polymer due to the fluorine compound present therein was as follows.

KBr tablet method: 690 cm$_{-1}$ (sharp & small); 740 cm$^{-1}$ (sharp & medium); 1190 cm$^{-1}$ (small); 1290 cm$^{-1}$ (small).

Also, the mol fractions of (a), (b) and (c) were 0.20, 0.50, and 0.30, respectively.

[PRODUCTION EXAMPLE 20 (Comparative)]

Into a four-necked flask of 300 ml capacity, there were charged 68 ml of isopropyl alcohol of the purest quality and 22.88 g of the polymer having the functional group as used in Measurement Example 1 above, and the batch was agitated for 20 minutes at 50° C. To this mixture solution, 5.0 ml of isopropyl alcohol solution of 10% sulfuric acid was slowly dropped, after which the reaction was continued for 1.2 hours at 70° C. After completion of the reaction, the resulted polymer was thrown into water to subject the polymer to filtration. Following this, the polymer was washed with methanol and water in the order as mentioned. The weight of the polymer after its drying was 25.93 g. The mol fractions of (a), (b) and (c) were respectively 0.20, 0.23, and 0.57 (it is to be noted that the structural unit (b) of this Example is the isopropyl group not containing therein fluorine).

[Protein Adsorption Test (Batch Method)]

In the same test method as described in the foregoing, adsorption of bovine serum γ-globulin and bovine serum alubmin was carried out, the results of which are as shown in Tables 10 to 12 below.

Figure 5:
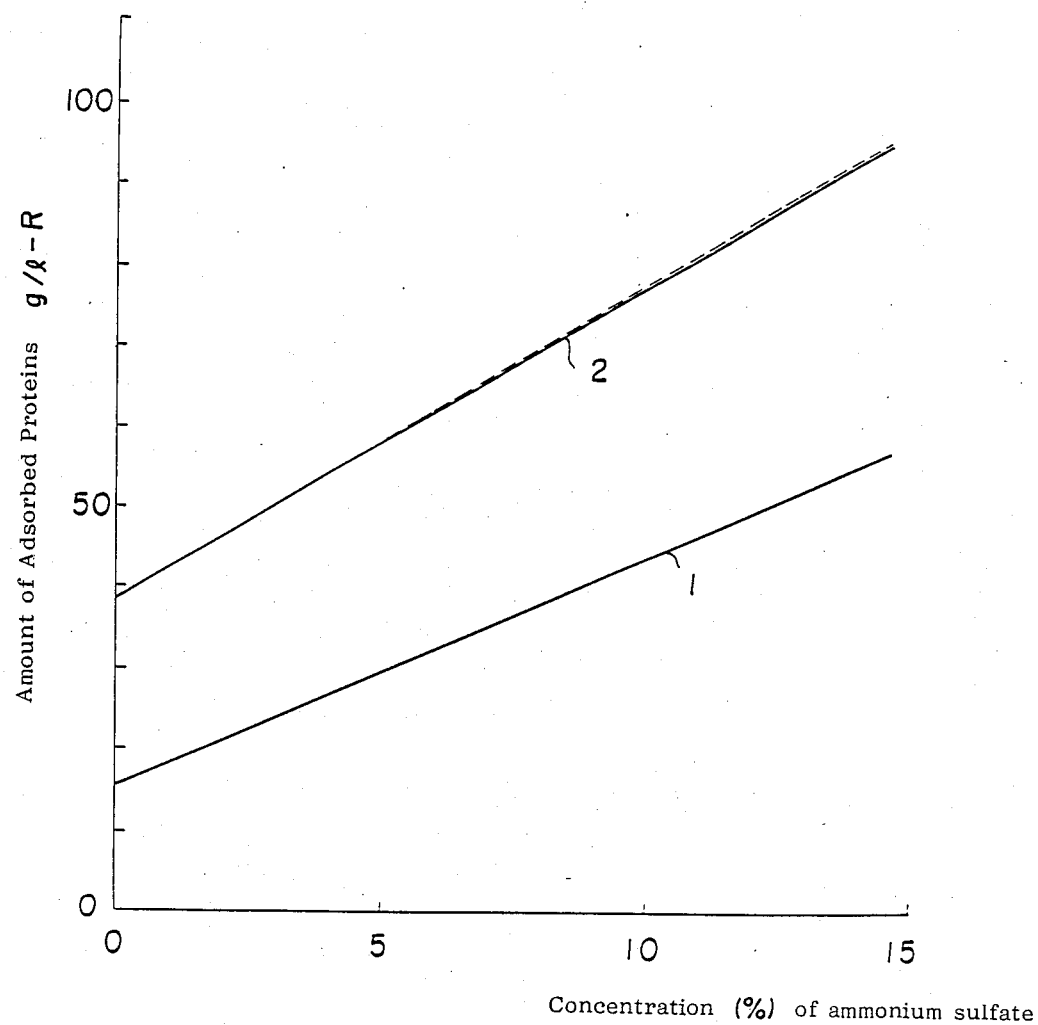
FIG. 5 is a graphical representation showing the results of the protein adsorption test (batch method) for the same separating agent, wherein the abscissa denotes the concentration (%) of ammonium sulfate in the solution and the ordinate represents the quantity of adsorbed protein (g/l-R)

On the other hand, there was also conducted the adsorption test on 1.0% of bovine serum alubmin (curve 1) and bovine serum globulin (curve 2) by use of the separating agent obtained in Production Example 18 in ammonium sulfate buffer solution of different concentration. The results are as shown by curves (1) and (2) in FIG. 5.

TABLE 10

Quantity of Adsorbed γ-Globulin (*1)

| Adsorbent | Quantity Adsorbed (g/l-R) |
|---|---|
| Production Ex. 17 | 21.3 |
| Ex. 19 | 32.1 |
| Ex. 20 | 4.40 |

(*1) 0.20% γ-globulin (bovine serum)
0.10 M tris-hydrochloric acid buffer solution (pH 7.50)

TABLE 11

Quantity of Adsorbed Albumin (*2)

| Adsorbent | Quantity Adsorbed (g/l-R) |
|---|---|
| Production Ex. 17 | 10.9 |
| Ex. 19 | 12.7 |
| Ex. 20 | 0.0 |

(*2) alubmin (bovine serum)
0.10 M tris-hydrochloric acid buffer solution (pH 7.50)

TABLE 12

Equilibrated Quantity of Adsorption of Protein (*3)

| Adsorbent | γ-globulin (mg/g-R) | alubmin (mg/g-R) |
|---|---|---|
| Production Ex. 19 | 159 | 80.9 |
| Cell-$C_{12}$ (*1) | 29.8(*) | 22.4(*) |
| HP-20 ® (*2) | 49.8(*) | 30.1(*) |

(*1) An adsorbent produced by introducing dodecyl group into a cellulosic carrier
(*2) Styrene type porous resin (a product of Mitsubishi Chemical Industries Ltd.)
(*)Values quoted from "Collection of 40th Lecture Meeting of Nippon Chemical Fiber Laboratory (1983), page 73"
(*3) 0.10 M tris-hydrochloric acid buffer solution (pH 7.50)

As is apparent from Tables 10 and 11 above, the separating agent according to the present invention containing therein the branched chain fluoroalkyl group exhibits remarkably high adsorptibility in comparison with the same cross-linked copolymer, but not containing therein the fluoroalkyl group.

[Protein Adsorption Test (Column Method)]
Conditions for Measurement

Figure 4:
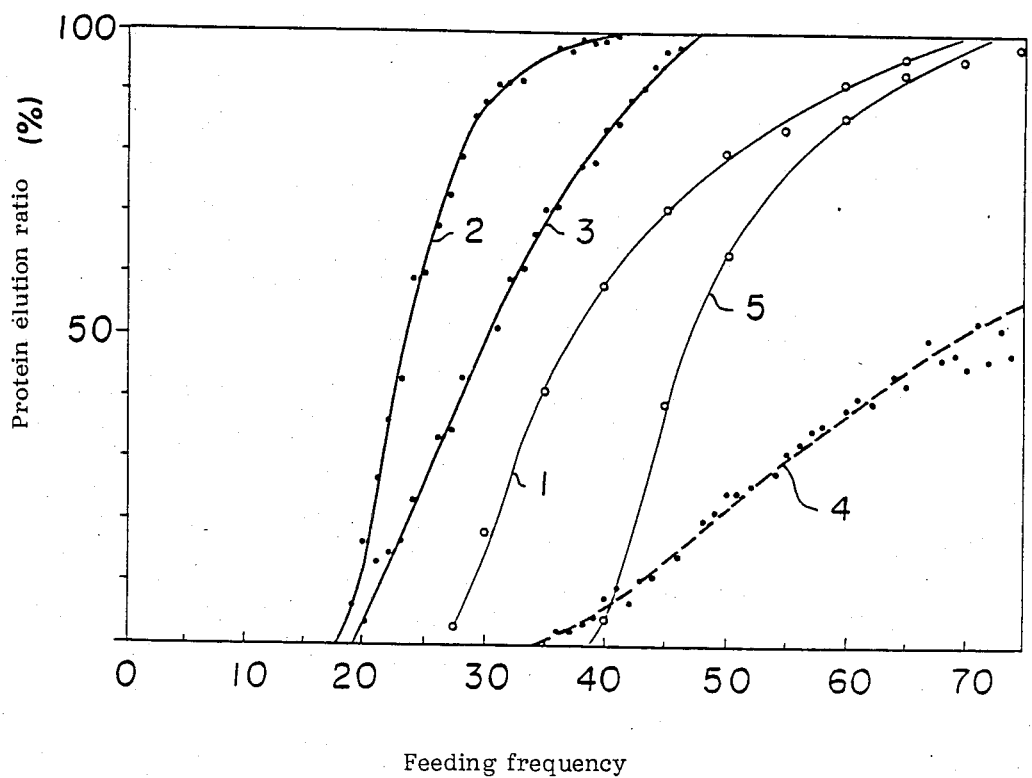
FIG. 4 is a graphical representation showing the results of the protein adsorption test (column method) for the separating agent obtained from Production Example 18 according to the present invention, wherein the abscissa denotes feeding frequency of test specimen and the ordinate represents of protein elution ratio (%)

Separator: copolymer particles obtained in Production Example 18
Particle size of resin: 88 to 105 μm
Column: 8 mm (inner dia.) × 100 mm (height) (5.0 ml)
Eluent: 1/10 M phosphate buffer solution (pH 7.40)
Flowrate: 0.501 ml/min.
Protein: as listed hereinbelow (product of Sigma Co., Ltd.)
Charging quantity of protein: 200 μl of 2.0% solution of protein
Method for charging: pulse injection at every 20 minutes' interval
Method for detection: ultraviolet having wavelength of 280 nm Under the above-mentioned conditions, 2.0% solution of protein was poured into the column filled with the separator at every 20 minutes' interval, and its adsorptibility was evaluated by measuring presence or absence of elution at every time. The results of the measurement are as shown in FIG. 4. The protein used for the adsorption test was: (1) α-lactalubmin, (2) ovalalbumin, (3) bovine serum alubmin, (4) bovine serum γ-globulin, and (5) thyroglobulin.

(MEASUREMENT EXAMPLE 2)

Figure 6:
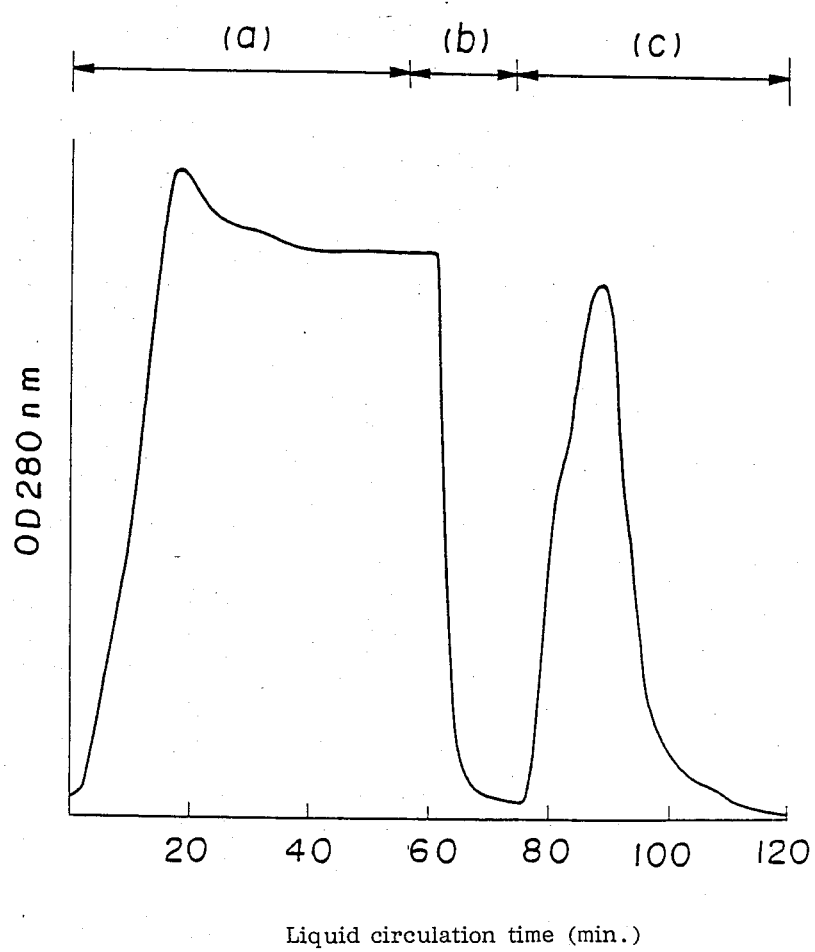
FIG. 6 is a graphical representation showing the results of the protein adsorption test (column method) for the separating agent carried out in Measurement Example 2, wherein the abscissa denotes liquid circulation time (minute) and the ordinate represents light absorbance or optical density (at 280 nm).

5 ml of the separator as obtained in Production Example 17 above was charged into a glass column having an inner diameter of 12 mm, and sufficiently equilibrated with use of 0.10 M of acetate buffer solution (pH 4.70). Subsequently, 20 ml of 2% solution of bovine serum alubmin (0.10 M acetate buffer, pH 4.70) was circulated in the column until it reached a state of equilibrium. Thereafter, the protein solution was washed with 0.10 M acetate buffer solution (pH 4.70). Following the washing, the bovine serum alubmin adsorbed to the separator was eluted by use of 1% solution of SDS (0.10 M acetate buffer solution (pH 4.70)). The flow rate of the buffer solution was 1.0 ml/min. This series of operations was repeated for three times. FIG. 6 indicates the chromatogram at the third stage of the operation. Furthermore, the adsorbed quantity of the bovine serum alubmin at the third stage was 26 mg/ml-separator, and its rate of recovery was 99%. In the graphical representation of FIG. 6, reference letters (a), (b) and (c) denote respectively 'adsorption', 'washing' and 'elution' steps.

We claim:

1. A separating agent, consisting essentially of porous particles of a cross-linked copolymer having a porosity in a range of from 0.5 to 3 ml/g and an average particle diameter in a range of from 1 to 2,000 μm, said copolymer being composed essentially of a cross-linking component consisting of alkylene di(meth)acrylate and/or glycerine poly(meth)acrylate; an ester component containing a fluorine compound represented by the following general formulae (1) and/or (2); and a glycerine-derived ester component and/or a polyethylene glycol ester component represented by the following general formulae (3) and/or (4):

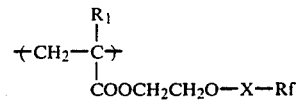  (1)

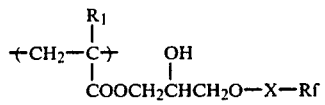  (2)

(in the above general formulae (1) and (2), $R_1$ denotes hydrogen or a methyl group; X represents a methylene group or a carbonyl group; and Rf designates a fluoroalkyl group in a straight chain or branched chain form, and having less than 10 carbon atoms)

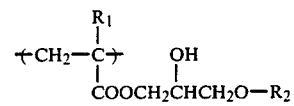  (3)

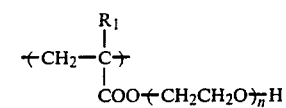  (4)

(in the above general formulae (3) and (4), $R_1$ denotes hydrogen or a methyl group; $R_2$ represents $+CH_2CH_2\!\!\rightarrow_l\!\!H$ (l is an integer of from 0 to 10), $-CH_2C(CH_2OH)_3$,

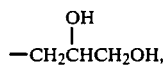

—Glu (Glu is a residual group of glucose), —(CD designates a residual group of cyclodextrin), or

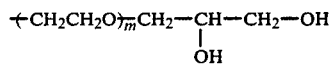

(m is an integer of 0 or 1; and n is an integer of from 1 to 4).

2. A separating agent according to claim 1, consisting essentially of porous cross-linked copolymer particles composed essentially of structural units (a), (b) and (c) represented by the following general formulae:

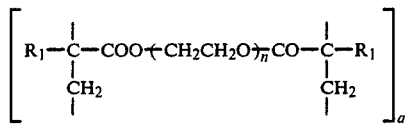

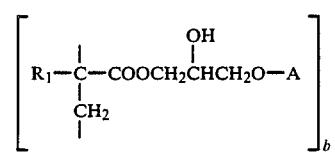

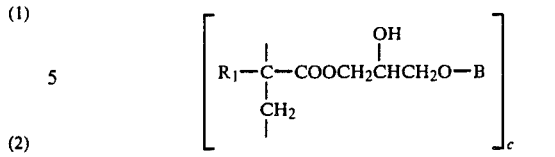

[in the above general formulae (a), (b) and (c), $R_1$ denotes hydrogen or a methyl group; n is an integer of from 1 to 3; A represents $-CH_2CF_3$, $-CH_2CF_2CF_2CF_3$, $-COCF_3$, $-COCF_2CF_2CF_3$, or $-CH(CF_3)CF_3$; B designates $-H$, $-CH_2CH_2OH$, $-CH_2CH(OH)CH_2OH$, $-CH_2C(CH_2OH)_3$, —Glu (Glu is a residual group of glucose, or —CD (CD is a residual group of cyclodextrin); and mol fractions of (a), (b) and (c) are 0.01 to 0.55, 0.01 to 0.90, and 0.01 to 0.95, respectively.]

3. A separating agent according to claim 1, consisting essentially of porous cross-linked copolymer particles composed essentially of structural units (a), (b) and (c) represented by the following general formulae, with the fluorine content in said polymer particles ranging from 1 to 20% by weight, and being useful as a gel-permeation chromatographic carrier:

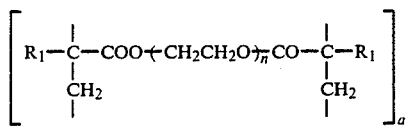

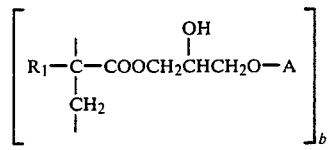

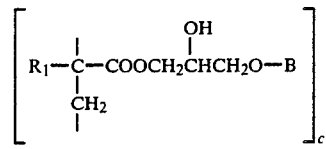

[in the above general formulae (a), (b) and (c), $R_1$ denotes hydrogen or a methyl group; n is an integer of from 1 to 3; A represents $-CH_2CF_3$, $-CH_2CF_2CF_2CF_3$, or $-COCF_2CF_2CF_3$; B designates $-H$, $-CH_2CH_2OH$, $-CH_2CH(OH)CH_2OH$, $-CH_2C(CH_2OH)_3$, —Glu (Glu is a residual group of glucose), or —CD (CD is a residual group of cyclodextrin); the mol fractions of (a), (b) and (c) are 0.01 to 0.55, 0.01 to 0.70, and 0.10 to 0.95, respectively.]

4. A separating agent according to claim 1, consisting essentially of porous cross-linked copolymer particles composed essentially of structural units (a), (b) and (c) represented by the following general formulae, with the fluorine content in said polymer particles ranging from 10 to 60% by weight, and being useful as an adsorptive separator:

$$\left[ R_1-\underset{\underset{|}{CH_2}}{\overset{|}{C}}-COO(CH_2CH_2O)_{\overline{n}}CO-\underset{\underset{|}{CH_2}}{\overset{|}{C}}-R_1 \right]_a$$

$$\left[ R_1-\underset{\underset{|}{CH_2}}{\overset{|}{C}}-COOCH_2\overset{OH}{\overset{|}{CH}}CH_2O-A \right]_b$$

$$\left[ R_1-\underset{\underset{|}{CH_2}}{\overset{|}{C}}-COOCH_2\overset{OH}{\overset{|}{CH}}CH_2O-B \right]_c$$

[in the above general formulae (a), (b) and (c), $R_1$ denotes hydrogen or a methyl group; n is an integer of from 1 to 3; A represents —$CH(CF_3)CF_3$; B designates —H, —$CH_2CH_2OH$, or —$CH_2CH(OH)CH_2OH$; and the mol fractions of (a), (b) and (c) are 0.01 to 0.55, 0.10 to 0.90, and 0.01 to 0.70, respectively.]

5. A separating agent according to claim 1, consisting essentially of porous copolymer particles composed essentially of structural units (a), (b) and (c) represented by the following general formulae:

$$\left[ R_1-\underset{\underset{|}{CH_2}}{\overset{|}{C}}-COOCH_2\overset{OH}{\overset{|}{CH}}CH_2OCO-\underset{\underset{|}{CH_2}}{\overset{|}{C}}-R_1 \right]_a$$

$$\left[ R_1-\underset{\underset{|}{CH_2}}{\overset{|}{C}}-COOCH_2\overset{OH}{\overset{|}{CH}}CH_2O-A \right]_b$$

$$\left[ R_1-\underset{\underset{|}{CH_2}}{\overset{|}{C}}-COOCH_2\overset{OH}{\overset{|}{CH}}CH_2O-B \right]_c$$

[in the above general formulae (a), (b) and (c), $R_1$ denotes hydrogen or a methyl; A represents —$CH_2CF_3$, —$CH_2CF_2CF_2CF_3$, —$COCF_2CF_2CF_3$, or —$CH(CF_3)CF_3$; B designates —H, —$CH_2CH_2OH$, or —$CH_2CH(OH)CH_2OH$; and the mol fractions of (a), (b) and (c) are 0.01 to 0.55, 0.01 to 0.90, and 0.01 to 0.95, respectively.]

6. A separating agent according to claim 1, consisting essentially of porous cross-linked copolymer particles composed essentially of structural units (a), (b) and (c) represented by the following general formulae, with the fluorine content in said polymer particles ranging from 1 to 20% by weight, and being useful as a gel-permeation chromatographic carrier:

$$\left[ R_1-\underset{\underset{|}{CH_2}}{\overset{|}{C}}-COOCH_2\overset{OH}{\overset{|}{CH}}CH_2OCO-\underset{\underset{|}{CH_2}}{\overset{|}{C}}-R_1 \right]_a$$

$$\left[ R_1-\underset{\underset{|}{CH_2}}{\overset{|}{C}}-COOCH_2\overset{OH}{\overset{|}{CH}}CH_2O-A \right]_b$$

$$\left[ R_1-\underset{\underset{|}{CH_2}}{\overset{|}{C}}-COOCH_2\overset{OH}{\overset{|}{CH}}CH_2O-B \right]_c$$

[in the above general formulae (a), (b) and (c), $R^1$ denotes hydrogen or a methyl group; A represents —$CH_2CF_3$, —$CH_2CF_2CF_2CF_3$, or —$COCF_2CF_2CF_3$; B designates —H, —$CH_2CH_2OH$, or —$CH_2CH(OH)CH_2OH$; and the mol fractions of (a), (b) and (c) are 0.01 to 0.55, 0.01 to 0.70, and 0.10 to 0.95, respectively.]

7. A separating agent according to claim 1, consisting essentially of porous cross-linked copolymer particles composed essentially of structural units (a), (b) and (c) to be represented by the following general formulae, with the fluorine content in said polymer particles ranging from 10 to 60% by weight, and being useful as an adsorptive separator:

$$\left[ R_1-\underset{\underset{|}{CH_2}}{\overset{|}{C}}-COOCH_2\overset{OH}{\overset{|}{CH}}CH_2OCO-\underset{\underset{|}{CH_2}}{\overset{|}{C}}-R_1 \right]_a$$

$$\left[ R_1-\underset{\underset{|}{CH_2}}{\overset{|}{C}}-COOCH_2\overset{OH}{\overset{|}{CH}}CH_2O-A \right]_b$$

$$\left[ R_1-\underset{\underset{|}{CH_2}}{\overset{|}{C}}-COOCH_2\overset{OH}{\overset{|}{CH}}CH_2O-B \right]_c$$

[in the above general formulae (a), (b) and (c), $R_1$ denotes hydrogen or a methyl group; A designates —$CH(CF_3)CF_3$; B represents —H, —$CH_2CH_2OH$, or —$CH_2CH(OH)CH_2OH$; and the mol fractions of (a), (b) and (c) are 0.01 to 0.55, 0.10 to 0.90, and 0.01 to 0.70, respectively.]

8. A separating agent according to claim 1, consisting essentially of porous copolymer particles composed essentially of structural units (a), (b) and (c) to be represented by the following general formulae:

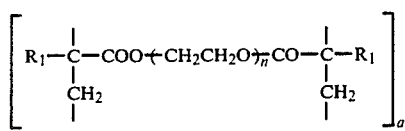

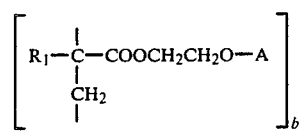

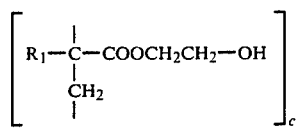

[in the above general formulae (a), (b) and (c), $R_1$ denotes hydrogen or a methyl group; n is an integer of from 1 to 3; A represents $-COCF_2CF_2CF_3$ or $-COCF_3$; and the mol fractions of (a), (b) and (c) are 0.01 to 0.55, 0.01 to 0.70, and 0.10 to 0.95, respectively.]

9. A separating agent according to claim 8, wherein the fluorine content in said porous cross-linked copolymer particles ranges from 1 to 20% by weight, and that it is used as the gel-permeation chromatographic carrier.

10. A separating agent according to claim 1, characterized in that it is a protein separator.

* * * * *